US010691979B2

(12) United States Patent
Dal Mutto et al.

(10) Patent No.: US 10,691,979 B2
(45) Date of Patent: Jun. 23, 2020

(54) SYSTEMS AND METHODS FOR SHAPE-BASED OBJECT RETRIEVAL

(71) Applicant: AQUIFI, INC., Palo Alto, CA (US)

(72) Inventors: Carlo Dal Mutto, Sunnyvale, CA (US); Alvise Memo, Marcon (IT)

(73) Assignee: AQUIFI, INC., Palo Alto, CA (US)

( * ) Notice: Subject to any disclaimer, the term of this patent is extended or adjusted under 35 U.S.C. 154(b) by 20 days.

(21) Appl. No.: 15/862,512

(22) Filed: Jan. 4, 2018

(65) Prior Publication Data

US 2018/0189611 A1    Jul. 5, 2018

Related U.S. Application Data

(60) Provisional application No. 62/442,223, filed on Jan. 4, 2017.

(51) Int. Cl.
*G06K 9/62* (2006.01)
*G06K 9/00* (2006.01)
(Continued)

(52) U.S. Cl.
CPC ....... *G06K 9/6267* (2013.01); *G06K 9/00201* (2013.01); *G06T 7/90* (2017.01); *G06T 17/20* (2013.01); *G06T 2207/20084* (2013.01)

(58) Field of Classification Search
CPC .............. G06T 19/20; G06T 2210/16; G06T 2219/2021; G06T 17/20; G06T 11/001;
(Continued)

(56) References Cited

U.S. PATENT DOCUMENTS 9,392,262 B2 * 7/2016 Dal Mutto .......... H04N 13/254
9,516,295 B2 * 12/2016 Dal Mutto .......... H04N 13/254
(Continued)

OTHER PUBLICATIONS

Cignoni, P. et al., "MeshLab: an Open-Source Mesh Processing Tool", Eurographics Italian Chapter Conference (2008), 8 pages.
(Continued)

*Primary Examiner* — Jingge Wu
(74) *Attorney, Agent, or Firm* — Lewis Roca Rothgerber Christie LLP

(57) ABSTRACT

A method for classifying physical objects includes: controlling, by a processor, one or more depth cameras to capture depth images of a query object; controlling, by the processor, one or more color cameras to capture a color images of the query object; computing, by the processor, a three-dimensional (3D) model of the query object using the depth images; combining, by the processor, the color images with the 3D model; computing, by the processor, a descriptor from the 3D model and the color images, the descriptor including: a multi-dimensional shape descriptor space representation of a 3D shape of the query object; a multi-dimensional color descriptor space representation of a texture of the query object; and a one-dimensional size descriptor space representation of a size of query object; supplying, by the processor, the descriptor to a classifier to compute a classification of the query object; and outputting the classification of the query object.

16 Claims, 8 Drawing Sheets
(3 of 8 Drawing Sheet(s) Filed in Color)

(51) Int. Cl.
  *G06T 7/90* (2017.01)
  *G06T 17/20* (2006.01)
(58) Field of Classification Search
  CPC ... G06T 7/90; G06F 16/5854; G06K 9/00208;
        G06K 9/00201; G06K 9/00523; G06K
        9/46; G06K 9/6267; H04N 13/275
  See application file for complete search history.

(56) References Cited

U.S. PATENT DOCUMENTS

| | | | |
|---|---|---|---|
| 9,674,504 | B1 | 6/2017 | Salvagnini et al. |
| 10,055,882 | B2* | 8/2018 | Marin .................... G06T 11/001 |
| 2008/0065615 | A1* | 3/2008 | Bober ................ G06K 9/00201 |
| 2011/0085697 | A1* | 4/2011 | Clippard .............. G06K 9/4652 382/100 |
| 2011/0202527 | A1* | 8/2011 | McCloskey ......... G06F 16/7328 707/728 |
| 2011/0311129 | A1* | 12/2011 | Milanfar ............ G06K 9/00335 382/154 |
| 2013/0155063 | A1* | 6/2013 | Solem ................ G06K 9/00221 345/420 |
| 2015/0161476 | A1* | 6/2015 | Kurz .................... G06K 9/4671 382/190 |
| 2015/0256813 | A1 | 9/2015 | Dal Mutto et al. |
| 2015/0294191 | A1* | 10/2015 | Zhang .................... G06N 20/00 382/160 |
| 2015/0302505 | A1 | 10/2015 | Di et al. |
| 2016/0078057 | A1* | 3/2016 | Perez de la Coba ........................ G06K 9/6212 707/772 |
| 2016/0210602 | A1 | 7/2016 | Siddique et al. |
| 2018/0047158 | A1* | 2/2018 | Geva .................... G06T 7/0012 |

OTHER PUBLICATIONS

Horn, Berthold, Robot vision, 1986, pp. 206-209, 10.4 "Bidirectional Reflectance Distribution Function", MIT press.
Szeliski, R., "Computer Vision: Algorithms and Applications", Springer, 2010 pp. 467-503.
U.S. Appl. No. 62/448,952, "Defect Detection and Analysis with Multi-View 3D Sensors," filed Jan. 20, 2017.
International Search Report and Written Opinion dated Mar. 6, 2018 for corresponding PCT Application No. PCT/US18/12407 (10 pages).
Besl, Paul J., and Neil D. McKay. "Method for registration of 3-D shapes." Robotics-DL tentative. International Society for Optics and Photonics, 1992, 18 pages.
Boureau, Y. L., Ponce, J., & LeCun, Y. (2010). A theoretical analysis of feature pooling in visual recognition. In Proceedings of the 27th international conference on machine learning (ICML-10) (pp. 111-118).
Chatfield, K., Simonyan, K., Vedaldi, A., & Zisserman, A. (2014). Return of the devil in the details: Delving deep into convolutional nets. arXiv preprint arXiv:1405.3531, 22 pages.
Chen, D. Y., Tian, X. P., Shen, Y. T., & Ouhyoung, M. (Sep. 2003). On visual similarity based 3-D model retrieval. In Computer graphics forum (vol. 22, No. 3, pp. 223-232). Blackwell Publishing, Inc.
Daras, P., & Axenopoulos, A. (2010). A 3-D shape retrieval framework supporting multimodal queries. International Journal of Computer Vision, 89(2-3), 229-247.
Furuya, T., & Ohbuchi, R. (Jul. 2009). Dense sampling and fast encoding for 3-D model retrieval using bag-of-visual features. In Proceedings of the ACM international conference on image and video retrieval (8 pages). ACM.
Gao, Y., & Dai, Q. (2014). View-based 3-D object retrieval: challenges and approaches. IEEE MultiMedia, 3(21), 52-57.
Gupta, S., Girshick, R., Arbeláez, P., & Malik, J. (Sep. 2014). Learning rich features from RGB-D images for object detection and segmentation. In European Conference on Computer Vision (pp. 345-360). Springer International Publishing.
LeCun, Y., & Bengio, Y. (1995). Convolutional networks for images, speech, and time series. The handbook of brain theory and neural networks, 3361(10), 14 pages.
Mattone, R., Campagiorni, G., & Galati, F. (2000). Sorting of items on a moving conveyor belt. Part 1: A technique for detecting and classifying objects. Robotics and Computer-Integrated Manufacturing, 16(2), 73-80.
Su, H., Maji, S., Kalogerakis, E., & Learned-Miller, E. (2015). Multi-view convolutional neural networks for 3-D shape recognition. In Proceedings of the IEEE International Conference on Computer Vision (pp. 945-953).
Tangelder, J. W., & Veltkamp, R. C. (2008). A survey of content based 3-D shape retrieval methods. Multimedia tools and applications, 39(3), 441-471.
van den Berg, J. P., & Zijm, W. H. M. (1999). Models for warehouse management: Classification and examples. International Journal of Production Economics, 59(1), 519-528.
Vranic, D. V., Saupe, D., & Richter, J. (2001). Tools for 3D-object retrieval: Karhunen-Loeve transform and spherical harmonics. In Multimedia Signal Processing, 2001 IEEE Fourth Workshop on (pp. 293-298). IEEE.
Weinberger, K. Q., Blitzer, J., & Saul, L. K. (2005). Distance metric learning for large margin nearest neighbor classification. In Advances in neural information processing systems (pp. 1473-1480).

* cited by examiner

SYSTEMS AND METHODS FOR SHAPE-BASED OBJECT RETRIEVAL

CROSS-REFERENCE TO RELATED APPLICATION(S)

This application claims the benefit of U.S. Provisional Patent Application No. 62/442,223 filed in the United States Patent and Trademark Office on Jan. 4, 2017, the entire disclosure of which is incorporated by reference herein.

FIELD

Aspects of embodiments of the present invention relate to the field of computer vision, in particular, the retrieval or recognition of objects based on shape. In some embodiments, objects are scanned using one or more range (or depth) cameras and one or more color (e.g., red green blue or RGB) cameras.

BACKGROUND

In many contexts, it is useful to automatically recognize or classify physical objects as being instances of particular classes or types of objects. Such automated systems can be used to automate sorting activities that would otherwise require a human to manually view the objects being sorted and to manipulate the objects to perform the sorting process (e.g., directing the object to a particular location by touching the object or by controlling a machine to do so).

One example of an application is in a factory that has a conveyor system, such as conveyor belts, for moving objects through the various stages of the manufacturing process, including assembly, distribution, and delivery processes. At any of the stages of the plant, many different types of objects may arrive, possibly from different production lines, and may therefore be different models of similar products, completely different products, incomplete portions or modules of objects, and the like. The objects may have different characteristics such as size and color. In many cases, the objects may be unsorted, where an object of one type (or class) may be followed by an object of a different type (or different class). As the objects arrive, each object may need to be correctly identified and characterized for subsequent handling. For example, objects may need to be placed inside a suitably sized box, matched with other similar objects (e.g., the left and the right shoe in a pair). As another example, each object arriving on the belt may need to be analyzed for quality assessment, with the goal to identify objects that do not satisfy specific requirements.

As another example, in the context of electronic commerce, an individual customer order may include many disparate items to be packaged into a single box. These items may arrive at a packaging center in random order and may be intermingled with items from other customers' orders. In such environments, it may be necessary to selectively place particular items into different boxes for each order in accordance with the particular list of items (e.g., a packing list).

SUMMARY

Aspects of embodiments of the present invention are directed to systems and methods for retrieval and classification of objects based on capturing information about the objects using one or more range and color cameras.

According to one embodiment of the present invention, a method for classifying physical objects includes: controlling, by a processor, one or more depth cameras to capture a plurality of depth images of a query object; controlling, by the processor, one or more color cameras to capture a plurality of color images of the query object; computing, by the processor, a three-dimensional (3D) model of the query object using the depth images; combining, by the processor, the color images with the 3D model; computing, by the processor, a descriptor from the 3D model and the color images, the descriptor including: a multi-dimensional shape descriptor space representation of a 3D shape of the query object; a multi-dimensional color descriptor space representation of a texture of the query object; and a one-dimensional size descriptor space representation of a size of query object; supplying, by the processor, the descriptor to a classifier to compute a classification of the query object; and outputting the classification of the query object.

The method may further include controlling a conveyor system configured to convey the query object to redirect the query object is accordance with the classification of the query object.

The method may further include displaying the classification of the query object on a display device.

The classifier may be a neural network.

The neural network may be trained based on an inventory of objects.

The computing the classification of the query object based on the descriptor may be performed by identifying a result object from the inventory of objects having a closest distance to the descriptor of the query object in shape descriptor space, color descriptor space, and size descriptor space.

The 3D model may include a 3D mesh model computed from the depth images.

The method may further include: rendering a plurality of two-dimensional (2D) views of the 3D mesh model; and computing the descriptor by supplying the 2D views to a convolutional stage of a neural network.

According to one embodiment of the present invention, a system for classifying physical objects includes: a processor; and memory storing instructions that, when executed by the processor, cause the processor to: control one or more depth cameras to capture a plurality of depth images of a query object; control one or more color cameras to capture a plurality of color images of the query object; compute a three-dimensional (3D) model of the query object using the depth images; combine the color images with the 3D model; compute a descriptor from the 3D model and the color images, the descriptor including: a multi-dimensional shape descriptor space representation of a 3D shape of the query object; a multi-dimensional color descriptor space representation of a texture of the query object; and a one-dimensional size descriptor space representation of a size of query object; supply the descriptor to a classifier to compute a classification of the query object; and output the classification of the query object.

The system may further include a conveyor system configured to convey the query object, wherein the memory may further store instructions that, when executed by the processor, cause the processor to redirect the query object is accordance with the classification of the query object.

The system may further include a display device, wherein the memory may further stores instructions that, when executed by the processor, cause the processor to display the classification of the query object on a display device.

The classifier may be a neural network.

The neural network may be trained based on an inventory of objects.

The memory may further stores instructions that, when executed by the processor, cause the processor to compute the classification of the query object by identifying a result object from the inventory of objects having a closest distance to the descriptor of the query object in shape descriptor space, color descriptor space, and size descriptor space.

The 3D model may include a 3D mesh model computed from the depth images.

The memory may further store instructions that, when executed by the processor, cause the processor to compute the descriptor by: rendering a plurality of two-dimensional (2D) views of the 3D mesh model; and computing the descriptor by supplying the 2D views to a convolutional stage of a neural network.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

Figure 1:
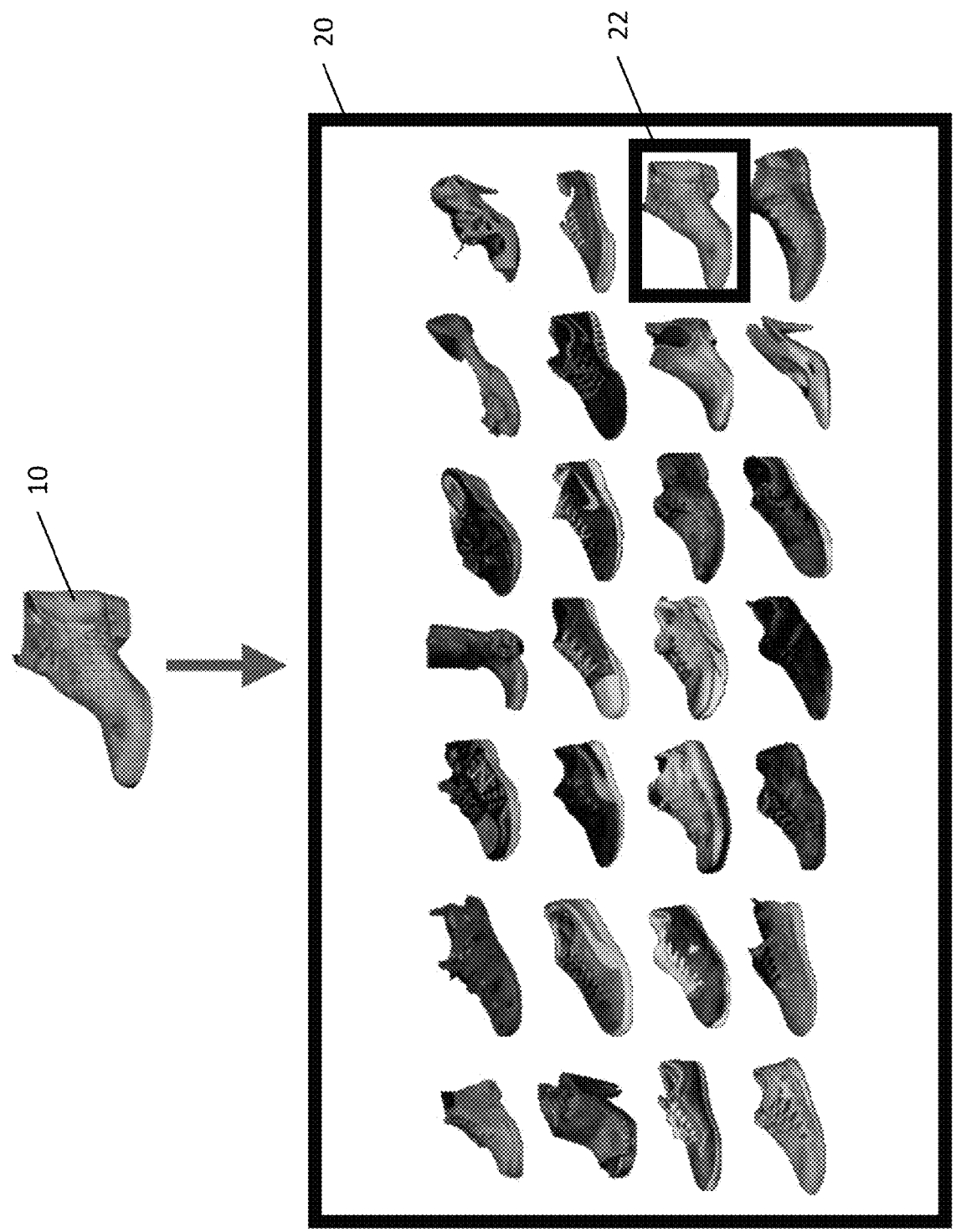
FIG. 1 is a schematic illustration of the process of classifying a target object, in this case a boot, as an instance of a particular style of boot in an inventory of shoes according to one embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Aspects of embodiments of the present invention relate to classifying objects by performing three-dimensional (3D) scans of the objects using one or more three-dimensional (3D) range (or depth) cameras and regular color cameras.

FIG. 1 is a schematic illustration of the process of classifying a target object 10, in this case a boot, as an instance of a particular style of boot 22 in an inventory of shoes 20 according to one embodiment of the present invention.

Figure 2A:
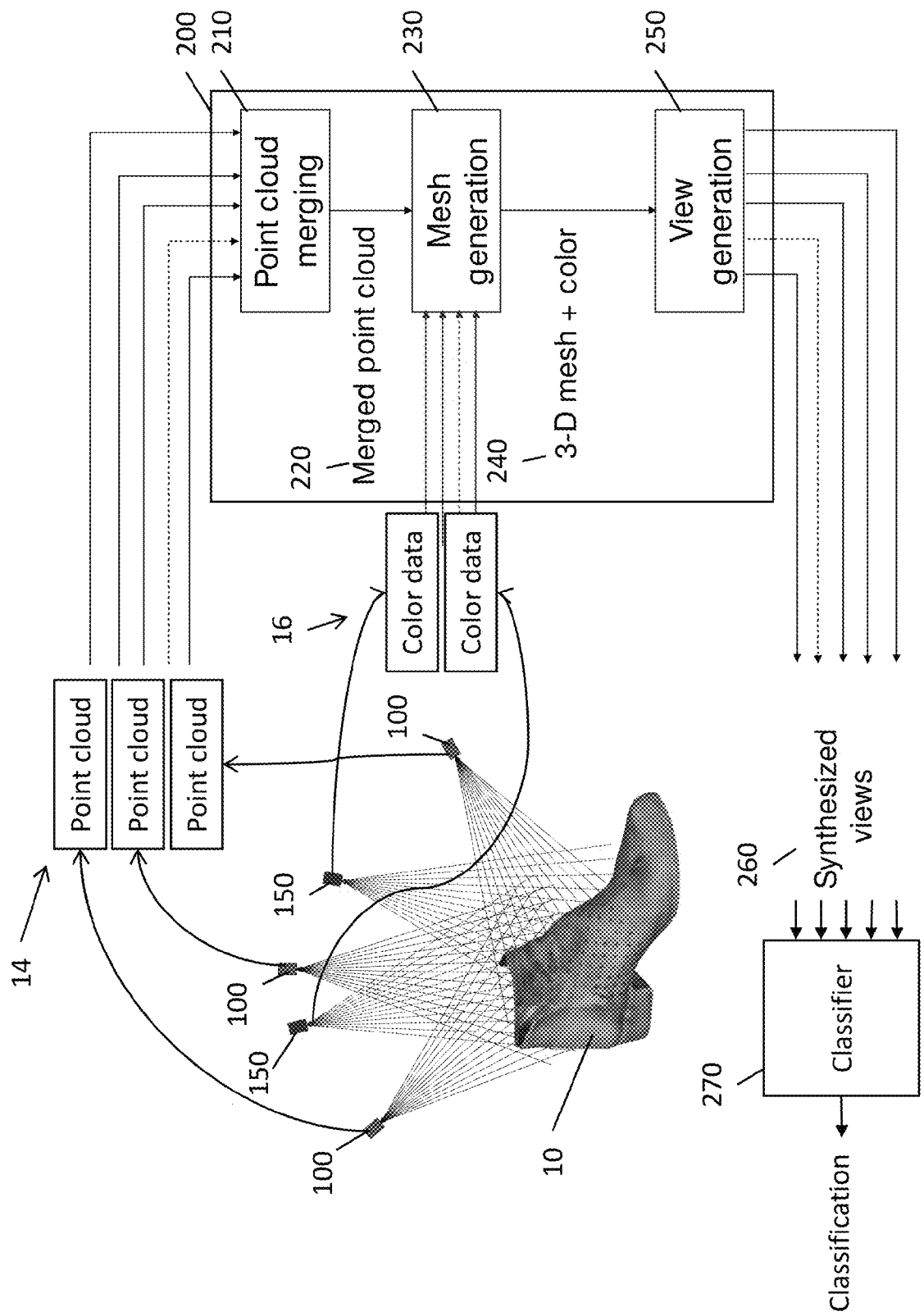
FIG. 2A is a schematic block diagram illustrating a process for capturing images of an object and generating a classification of the object according to one embodiment of the present invention.
Figure 3A:
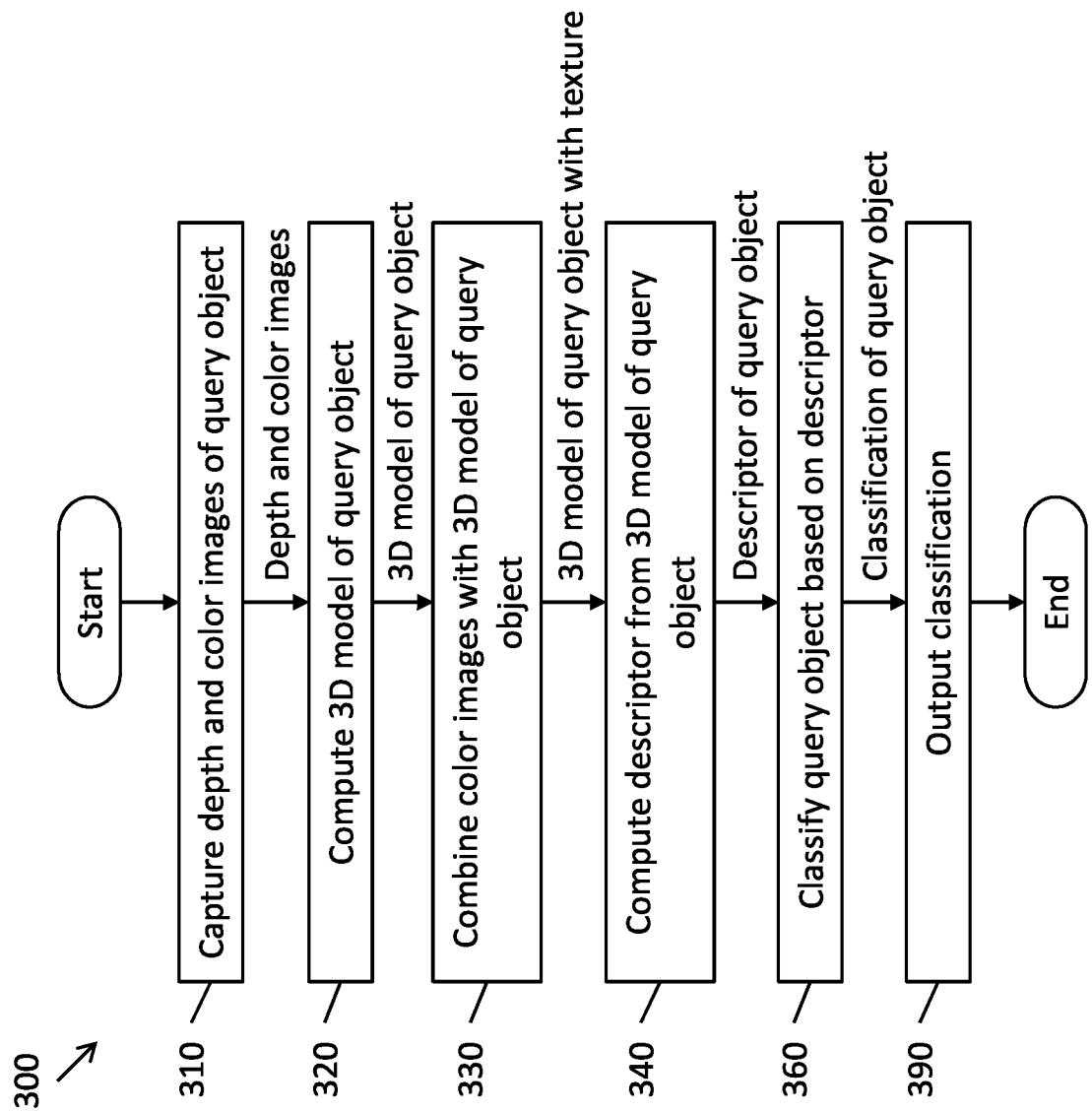
FIG. 3A is a flowchart of a method for generating a classification of an object according to one embodiment of the present invention.

FIG. 2A is a schematic block diagram illustrating a process for capturing images of an object and generating a classification of the object according to one embodiment of the present invention. FIG. 3A is a flowchart of a method for generating a classification of an object according to one embodiment of the present invention.

Various computational portions of embodiments of the present invention may be implemented through purpose-specific computer instructions executed by a computer system. The computer system may include one or more processors, including one or more central processing units, one or more graphics processing units (GPUs), one or more field programmable gate arrays (FPGAs), and/or one or more application specific integrated circuits (ASICs). The computations may be distributed across multiple separate computer systems, some of which may be local to the scanning of the query objects (e.g., on-site and connected directly to the depth and color cameras, or connected to the depth and color cameras over a local area network), and some of which may be remote (e.g., off-site, "cloud" based computing resources connected to the depth and color cameras through a wide area network such as the Internet). For the sake of convenience, the computer system configured using particular computer instructions to perform purpose specific operations for classifying query objects will be referred to as a classification system 200.

Referring to FIGS. 2A and 3A, according to some embodiments, in operation 310, the processor controls the depth (or "range") cameras 100 and color (e.g., red, green, blue or RGB) cameras 150 to capture depth and color images of the query object 10. The data captured by the range cameras 100 and the color cameras 150 (RGB cameras) that image are used to build a representation of the object 10 which is summarized in a feature vector or "descriptor" F. In some embodiments, each of the depth cameras 100 generates a three-dimensional (3D) point cloud 14 (e.g., a collection of three dimensional coordinates representing points on the surface of the object 10 that are visible from the pose of the corresponding one of the depth cameras 100) and the descriptor F is extracted from the generated 3D model.

Depth Cameras

In some embodiments of the present invention, the range cameras 100, also known as "depth cameras," include at least two standard two-dimensional cameras that have overlapping fields of view. In more detail, these two-dimensional (2D) cameras may each include a digital image sensor such as a complementary metal oxide semiconductor (CMOS) image sensor or a charge coupled device (CCD) image sensor and an optical system (e.g., one or more lenses) configured to focus light onto the image sensor. The optical axes of the optical systems of the 2D cameras may be substantially parallel such that the two cameras image substantially the same scene, albeit from slightly different perspectives. Accordingly, due to parallax, portions of a scene that are farther from the cameras will appear in substantially the same place in the images captured by the two cameras, whereas portions of a scene that are closer to the cameras will appear in different positions.

Using a geometrically calibrated depth camera, it is possible to identify the 3D locations of all visible points on the surface of the object with respect to a reference coordinate system (e.g., a coordinate system having its origin at the depth camera). Thus, a range image or depth image captured by a range camera 100 can be represented as a "cloud" of 3D points, which can be used to describe the portion of the surface of the object (as well as other surfaces within the field of view of the depth camera).

Figure 2B:
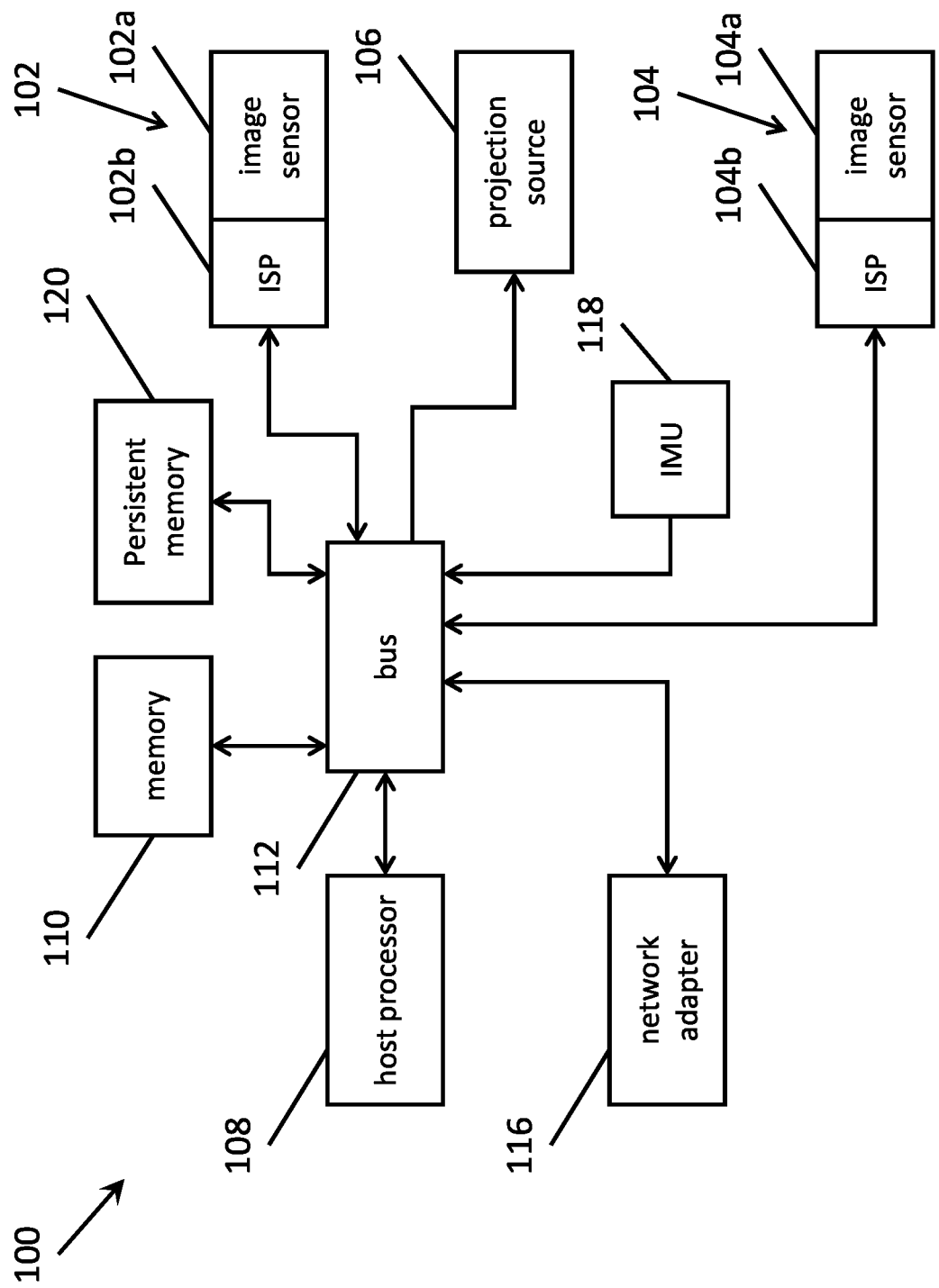
FIG. 2B is a block diagram of a stereo depth camera system according to one embodiment of the present invention.

FIG. 2B is a block diagram of a stereo depth camera system according to one embodiment of the present invention.

The depth camera system 100 shown in FIG. 2B includes a first camera 102, a second camera 104, a projection source 106 (or illumination source or active projection system), and a host processor 108 and memory 110, wherein the host processor may be, for example, a graphics processing unit (GPU), a more general purpose processor (CPU), an appropriately configured field programmable gate array (FPGA), or an application specific integrated circuit (ASIC). The first camera 102 and the second camera 104 may be rigidly attached, e.g., on a frame, such that their relative positions and orientations are substantially fixed. The first camera 102 and the second camera 104 may be referred to together as a "depth camera." The first camera 102 and the second camera 104 include corresponding image sensors 102a and 104a, and may also include corresponding image signal processors (ISP) 102b and 104b. The various components may communicate with one another over a system bus 112. The depth camera system 100 may include additional components such as a network adapter 116 to communicate with other devices, an inertial measurement unit (IMU) 118 such as a gyroscope to detect acceleration of the depth camera 100 (e.g., detecting the direction of gravity to determine orientation), and persistent memory 120 such as NAND flash memory for storing data collected and processed by the depth camera system 100. The IMU 118 may be of the type commonly found in many modern smartphones. The image capture system may also include other communication components, such as a universal serial bus (USB) interface controller.

Although the block diagram shown in FIG. 2B depicts a depth camera 100 as including two cameras 102 and 104 coupled to a host processor 108, memory 110, network adapter 116, IMU 118, and persistent memory 120, embodiments of the present invention are not limited thereto. For example, the three depth cameras 100 shown in FIG. 2A may each merely include cameras 102 and 104, projection source 106, and a communication component (e.g., a USB connection or a network adapter 116), and processing the two-dimensional images captured by the cameras 102 and 104 of the three depth cameras 100 may be performed by a shared processor or shared collection of processors in communication with the depth cameras 100 using their respective communication components or network adapters 116.

In some embodiments, the image sensors 102a and 104a of the cameras 102 and 104 are RGB-IR image sensors. Image sensors that are capable of detecting visible light (e.g., red-green-blue, or RGB) and invisible light (e.g., infrared or IR) information may be, for example, charged coupled device (CCD) or complementary metal oxide semiconductor (CMOS) sensors. Generally, a conventional RGB camera sensor includes pixels arranged in a "Bayer layout" or "RGBG layout," which is 50% green, 25% red, and 25% blue. Band pass filters (or "micro filters") are placed in front of individual photodiodes (e.g., between the photodiode and the optics associated with the camera) for each of the green, red, and blue wavelengths in accordance with the Bayer layout. Generally, a conventional RGB camera sensor also includes an infrared (IR) filter or IR cut-off filter (formed, e.g., as part of the lens or as a coating on the entire image sensor chip) which further blocks signals in an IR portion of electromagnetic spectrum.

An RGB-IR sensor is substantially similar to a conventional RGB sensor, but may include different color filters. For example, in an RGB-IR sensor, one of the green filters in every group of four photodiodes is replaced with an IR band-pass filter (or micro filter) to create a layout that is 25% green, 25% red, 25% blue, and 25% infrared, where the infrared pixels are intermingled among the visible light pixels. In addition, the IR cut-off filter may be omitted from the RGB-IR sensor, the IR cut-off filter may be located only over the pixels that detect red, green, and blue light, or the IR filter can be designed to pass visible light as well as light in a particular wavelength interval (e.g., 840-860 nm). An image sensor capable of capturing light in multiple portions or bands or spectral bands of the electromagnetic spectrum (e.g., red, blue, green, and infrared light) will be referred to herein as a "multi-channel" image sensor.

In some embodiments of the present invention, the image sensors 102a and 104a are conventional visible light sensors. In some embodiments of the present invention, the system includes one or more visible light cameras (e.g., RGB cameras) and, separately, one or more invisible light cameras (e.g., infrared cameras, where an IR band-pass filter is located across all over the pixels). In other embodiments of the present invention, the image sensors 102a and 104a are infrared (IR) light sensors.

In some embodiments in which the depth cameras 100 include color image sensors (e.g., RGB sensors or RGB-IR sensors), the color image data collected by the depth cameras 100 may supplement the color image data captured by the color cameras 150. In addition, in some embodiments in which the depth cameras 100 include color image sensors (e.g., RGB sensors or RGB-IR sensors), the color cameras 150 may be omitted from the system.

Generally speaking, a stereoscopic depth camera system includes at least two cameras that are spaced apart from each other and rigidly mounted to a shared structure such as a rigid frame. The cameras are oriented in substantially the same direction (e.g., the optical axes of the cameras may be substantially parallel) and have overlapping fields of view. These individual cameras can be implemented using, for example, a complementary metal oxide semiconductor (CMOS) or a charge coupled device (CCD) image sensor with an optical system (e.g., including one or more lenses) configured to direct or focus light onto the image sensor. The optical system can determine the field of view of the camera, e.g., based on whether the optical system is implements a "wide angle" lens, a "telephoto" lens, or something in between.

In the following discussion, the image acquisition system of the depth camera system may be referred to as having at least two cameras, which may be referred to as a "master" camera and one or more "slave" cameras. Generally speaking, the estimated depth or disparity maps computed from the point of view of the master camera, but any of the cameras may be used as the master camera. As used herein, terms such as master/slave, left/right, above/below, first/second, and CAM1/CAM2 are used interchangeably unless noted. In other words, any one of the cameras may be master or a slave camera, and considerations for a camera on a left side with respect to a camera on its right may also apply, by symmetry, in the other direction. In addition, while the considerations presented below may be valid for various numbers of cameras, for the sake of convenience, they will generally be described in the context of a system that includes two cameras. For example, a depth camera system may include three cameras. In such systems, two of the cameras may be invisible light (infrared) cameras and the third camera may be a visible light (e.g., a red/blue/green color camera) camera. All three cameras may be optically registered (e.g., calibrated) with respect to one another. One example of a depth camera system including three cameras is described in U.S. patent application Ser. No. 15/147,879 "Depth Perceptive Trinocular Camera System" filed in the United States Patent and Trademark Office on May 5, 2016, the entire disclosure of which is incorporated by reference herein.

To detect the depth of a feature in a scene imaged by the cameras, the depth camera system determines the pixel location of the feature in each of the images captured by the cameras. The distance between the features in the two images is referred to as the disparity, which is inversely related to the distance or depth of the object. (This is the effect when comparing how much an object "shifts" when viewing the object with one eye at a time—the size of the shift depends on how far the object is from the viewer's eyes, where closer objects make a larger shift and farther objects make a smaller shift and objects in the distance may have little to no detectable shift.) Techniques for computing depth using disparity are described, for example, in R. Szeliski. "Computer Vision: Algorithms and Applications", Springer, 2010 pp. 467 et seq.

The magnitude of the disparity between the master and slave cameras depends on physical characteristics of the depth camera system, such as the pixel resolution of cameras, distance between the cameras and the fields of view of the cameras. Therefore, to generate accurate depth measurements, the depth camera system (or depth perceptive depth camera system) is calibrated based on these physical characteristics.

In some depth camera systems, the cameras may be arranged such that horizontal rows of the pixels of the image sensors of the cameras are substantially parallel. Image rectification techniques can be used to accommodate distortions to the images due to the shapes of the lenses of the cameras and variations of the orientations of the cameras.

In more detail, camera calibration information can provide information to rectify input images so that epipolar lines of the equivalent camera system are aligned with the scanlines of the rectified image. In such a case, a 3D point in the scene projects onto the same scanline index in the master and in the slave image. Let $u_m$ and $u_s$ be the coordinates on the scanline of the image of the same 3D point p in the master and slave equivalent cameras, respectively, where in each camera these coordinates refer to an axis system centered at the principal point (the intersection of the optical axis with the focal plane) and with horizontal axis parallel to the scanlines of the rectified image. The difference $u_s-u_m$ is called disparity and denoted by d; it is inversely proportional to the orthogonal distance of the 3D point with respect to the rectified cameras (that is, the length of the orthogonal projection of the point onto the optical axis of either camera).

Stereoscopic algorithms exploit this property of the disparity. These algorithms achieve 3D reconstruction by matching points (or features) detected in the left and right views, which is equivalent to estimating disparities. Block matching (BM) is a commonly used stereoscopic algorithm. Given a pixel in the master camera image, the algorithm computes the costs to match this pixel to any other pixel in the slave camera image. This cost function is defined as the dissimilarity between the image content within a small window surrounding the pixel in the master image and the pixel in the slave image. The optimal disparity at point is finally estimated as the argument of the minimum matching cost. This procedure is commonly addressed as Winner-Takes-All (WTA). These techniques are described in more detail, for example, in R. Szeliski. "Computer Vision: Algorithms and Applications", Springer, 2010. Since stereo algorithms like BM rely on appearance similarity, disparity computation becomes challenging if more than one pixel in the slave image have the same local appearance, as all of these pixels may be similar to the same pixel in the master image, resulting in ambiguous disparity estimation. A typical situation in which this may occur is when visualizing a scene with constant brightness, such as a flat wall.

Methods exist that provide additional illumination by projecting a pattern that is designed to improve or optimize the performance of block matching algorithm that can capture small 3D details such as the one described in U.S. Pat. No. 9,392,262 "System and Method for 3D Reconstruction Using Multiple Multi-Channel Cameras," issued on Jul. 12, 2016, the entire disclosure of which is incorporated herein by reference. Another approach projects a pattern that is purely used to provide a texture to the scene and particularly improve the depth estimation of texture-less regions by disambiguating portions of the scene that would otherwise appear the same.

The projection source 106 according to embodiments of the present invention may be configured to emit visible light (e.g., light within the spectrum visible to humans and/or other animals) or invisible light (e.g., infrared light) toward the scene imaged by the cameras 102 and 104. In other words, the projection source may have an optical axis substantially parallel to the optical axes of the cameras 102 and 104 and may be configured to emit light in the direction of the fields of view of the cameras 102 and 104. In some embodiments, the projection source 106 may include multiple separate illuminators, each having an optical axis spaced apart from the optical axis (or axes) of the other illuminator (or illuminators), and spaced apart from the optical axes of the cameras 102 and 104.

An invisible light projection source may be better suited to for situations where the subjects are people (such as in a videoconferencing system) because invisible light would not interfere with the subject's ability to see, whereas a visible light projection source may shine uncomfortably into the subject's eyes or may undesirably affect the experience by adding patterns to the scene. Examples of systems that include invisible light projection sources are described, for example, in U.S. patent application Ser. No. 14/788,078 "Systems and Methods for Multi-Channel Imaging Based on Multiple Exposure Settings," filed in the United States Patent and Trademark Office on Jun. 30, 2015, the entire disclosure of which is herein incorporated by reference.

Active projection sources can also be classified as projecting static patterns, e.g., patterns that do not change over time, and dynamic patterns, e.g., patterns that do change over time. In both cases, one aspect of the pattern is the illumination level of the projected pattern. This may be relevant because it can influence the depth dynamic range of the depth camera system. For example, if the optical illumination is at a high level, then depth measurements can be made of distant objects (e.g., to overcome the diminishing of the optical illumination over the distance to the object, by a factor proportional to the inverse square of the distance) and under bright ambient light conditions. However, a high optical illumination level may cause saturation of parts of the scene that are close-up. On the other hand, a low optical illumination level can allow the measurement of close objects, but not distant objects.

Although embodiments of the present invention are described herein with respect to stereo depth camera systems, embodiments of the present invention are not limited thereto and may also be used with other depth camera systems such as structured light time of flight cameras and LIDAR cameras.

Depending on the choice of camera, different techniques may be used to generate the 3D model. For example, Dense Tracking and Mapping in Real Time (DTAM) uses color cues for scanning and Simultaneous Localization and Mapping uses depth data (or a combination of depth and color data) to generate the 3D model.

Capture of 3D Models

If depth images are captured at different poses (e.g., different locations with respect to the target object), then it is possible to acquire data regarding the shape of a larger portion of the surface of the target object than could be acquired by a single depth camera. For example, opposite surfaces of an object (e.g., the medial and lateral sides of the boot shown in FIG. 2A) can both be acquired, whereas a single camera at a single pose could only acquire a depth image of one side of the target object at a time. The multiple depth images can be captured by moving a single depth camera over multiple different poses or by using multiple depth cameras located at different positions. Merging the depth images (or point clouds) requires additional computation and can be achieved using techniques such as an Iterative Closest Point (ICP) technique (see, e.g., Besl, Paul J., and Neil D. McKay. "Method for registration of 3-D shapes." Robotics-DL tentative. International Society for Optics and Photonics, 1992.), which can automatically compute the relative poses of the depth cameras by optimizing (e.g., minimizing) a particular alignment metric. The ICP process can be accelerated by providing approximate initial relative poses of the cameras, which may be available if the cameras are "registered" (e.g., if the poses of the cameras are already known and substantially fixed in that their poses do not change between a calibration step and runtime operation). Systems and methods for capturing substantially all visible surfaces of an object are described in, for example, U.S. Provisional Patent Application No. 62/448,952, "Defect Detection and Analysis with Multi-View 3D Sensors," filed in the United States Patent and Trademark Office on Jan. 20, 2017, the entire disclosure of which is incorporated by reference herein.

A point cloud, which may be obtained by merging multiple aligned individual point clouds (individual depth images) can be processed to remove "outlier" points due to erroneous measurements (e.g., measurement noise) or to remove structures that are not of interest, such as surfaces corresponding to background objects (e.g., by removing points having a depth greater than a particular threshold depth) and the surface (or "ground plane") that the object is resting upon (e.g., by detecting a bottommost plane of points).

In some embodiments, the system further includes a plurality of color cameras 150 configured to capture texture data of the query object. The texture data may include the color, shading, and patterns on the surface of the object that are not present or evident in the physical shape of the object. In some circumstances, the materials of the target object may be reflective (e.g., glossy). As a result, texture information may be lost due to the presence of glare and the captured color information may include artifacts, such as the reflection of light sources within the scene. As such, some aspects of embodiments of the present invention are directed to the removal of glare in order to capture the actual color data of the surfaces. In some embodiments, this is achieved by imaging the same portion (or "patch") of the surface of the target object from multiple poses, where the glare may only be visible from a small fraction of those poses. As a result, the actual color of the patch can be determined by computing a color vector associated with the patch for each of the color cameras, and computing a color vector having minimum magnitude from among the color vectors. This technique is described in more detail in U.S. patent application Ser. No. 15/678,075, "System and Method for Three-Dimensional Scanning and for Capturing a Bidirectional Reflectance Distribution Function," filed in the United States Patent and Trademark Office on Aug. 15, 2017, the entire disclosure of which is incorporated by reference herein.

Returning to FIGS. 2A and 3A, in operation 320, the point clouds are combined to generate a 3D model. For example, in some embodiments, the separate point clouds 14 are merged by a point cloud merging module 210 to generate a merged point cloud 220 (e.g., by using ICP to align and merge the point clouds and also by removing extraneous or spurious points to reduce noise and to manage the size of the point cloud 3D model) and a mesh generation module 230 computes a 3D mesh 240 from the merged point cloud using techniques such as Delaunay triangulation and alpha shapes and software tools such as MeshLab (see, e.g., P. Cignoni, M. Callieri, M. Corsini, M. Dellepiane, F. Ganovelli, G. Ranzuglia MeshLab: an Open-Source Mesh Processing Tool Sixth Eurographics Italian Chapter Conference, pages 129-136, 2008.). In operation 330, the 3D mesh 240 can be combined with color information 16 from the color cameras 150 about the color of the surface of the object at various points, and this color information may be applied to the 3D mesh as a texture map (e.g., information about the color of the surface of the model).

In operation 340, the classification system 200 computes a descriptor from the 3D model, where the descriptor summarizes features of the query object 10. In some embodiments, a view generation module 250 of the classification system renders particular standardized two-dimensional (2D) views 260 of the mesh model 240. For example, the 3D mesh model 240 may be used to render 2D views of the surface of the object as viewed from multiple different viewpoints. In some embodiments, these 2D views may be more amenable for use with existing neural network technologies, such as convolutional neural networks (CNNs), although embodiments of the present invention are not limited thereto. For example, techniques for 3D shape retrieval methods are described in, for example, Tangelder, J. W., & Veltkamp, R. C. (2008). A survey of content based 3-D shape retrieval methods. Multimedia tools and applications, 39(3), 441-471.

In various embodiments of the present invention, different types of visual content may be used to synthesize or render these 2D views. By standardizing on a particular set of parameters for synthesizing these 2D views, 3D scans of similar objects (e.g., scans of two instances of the same manufacturer's model of shoe) will have substantially similar 2D views (whereas these 2D views may look substantially different if the synthetic illumination sources were different in the two models). Using standardized views also makes the categorization more robust by removing or reducing differences in the way that the 3D scans were captured (e.g., removing the factor of the particular orientation of the target object during scan).

In general, for any particular pose of a virtual camera with respect to the captured 3D model, the system may compute the image that would be acquired by a real camera at the same pose relative to the target object, with the object lit by a specific virtual illumination source or illumination sources, and with specific assumptions about the reflectance characteristics of the object's surface elements. For example, one may assume that all points on the surface have purely diffuse reflectance characteristics (such as in the case of a Lambertian surface model, see, e.g., Horn, Berthold. Robot vision. MIT press, 1986.) with constant albedo (as noted above, as described in U.S. patent application Ser. No. 15/679,075, "System and Method for Three-Dimensional Scanning and for Capturing a Bidirectional Reflectance Distribution Function," filed in the United States Patent and Trademark Office on Aug. 15, 2017, the entire disclosure of which is incorporated by reference herein, the texture of the 3D model may be captured to obtain a Lambertian surface model). One particular example of a virtual illumination source is an isotropic point illumination source that is co-located with the optical center of the virtual camera, the value of the image synthesized at a pixel is proportional to the cosine of the angle between the normal vector of the surface at the point seen by that pixel and the associated viewing direction (this essentially generates an effect similar to a taking a photograph with an on-camera flash activated). However, embodiments of the present invention are not limited thereto. For example, some embodiments of the present invention may make use of a completely diffuse illumination with a uniform albedo surface; in this case, the image would only capture the silhouette of the object (see, e.g., Chen, D. Y., Tian, X. P., Shen, Y. T., & Ouhyoung, M. (2003, September). On visual similarity based 3-D model retrieval. In Computer graphics forum (Vol. 22, No. 3, pp. 223-232). Blackwell Publishing, Inc.). Rather than assuming uniform albedo, in some embodiments, each point of the surface is assigned an albedo value derived from actual color or grayscale images taken by standard cameras (e.g., two-dimensional color or grayscale cameras, as opposed to depth cameras), which may be geometrically registered with the depth cameras used to acquire the shape of the object. In this case, the image generated for a virtual camera is similar to the actual image of the object that would be obtained by a regular camera, under a chosen illumination. In some embodiments, a vector of values is encoded for each pixel. For example, the "HHA" representation encodes, at each pixel, the inverse of the distance to the surface element seen by the pixel; the height of the surface element above ground; and the angle formed by the normal vector at the surface element and the gravity direction (see, e.g., Gupta, S., Girshick, R., Arbeláez, P., & Malik, J. (2014, September). Learning rich features from RGB-D images for object detection and segmentation. In European Conference on Computer Vision (pp. 345-360). Springer International Publishing.).

Various embodiments of the present invention may use different sets of poses for the virtual cameras in the multi-view representation of an object as described above. A fine sampling (e.g., larger number of views) may lead to a higher fidelity of view-based representation, at the cost of a larger amount of data to be stored and processed. For example, the LightField Descriptor (LFD) model (see, e.g., Chen, D. Y., Tian, X. P., Shen, Y. T., & Ouhyoung, M. (2003, September). On visual similarity based 3-D model retrieval. In Computer graphics forum (Vol. 22, No. 3, pp. 223-232). Blackwell Publishing, Inc.) generates ten views from the vertices of a dodecahedron over a hemisphere surrounding the object, while the Compact Multi-View Descriptor (CMVD) model (see, e.g., Daras, P., & Axenopoulos, A. (2010). A 3-D shape retrieval framework supporting multimodal queries. International Journal of Computer Vision, 89(2-3), 229-247.) generates eighteen characteristic views from the vertices of a bounding icosidodecahedron. While a large number of views may sometimes be required to acquire a description of the full surface, in some situations this may be unnecessary, for instance when objects that are placed on a conveyor belt with a consistent pose. For example, in the case of scanning shoes in a factory, the shoes may be placed so that their soles always lie on the conveyor belt. In such an environment, a satisfactory representation of the visible surface of a shoe could be obtained from a small number of views. More specifically, the depth cameras 100 and the color cameras 150 may all be placed at the same height and oriented so that their optical axes intersect at the center of the shoe, and the virtual cameras may similarly be placed along a plane that is aligned with the center of the shoe. As such, while the shoe may be rotated to any angle with its sole on the conveyor belt, the virtual cameras can render consistent views of, for example, the medial and lateral sides of the shoe, the front of the shoe, and the heel of the shoe.

In addition to being able to render consistent views of an object with respect to its orientation, some aspects of embodiments of the present invention relate to automatically building representations of the object's shape that are invariant to predictable parametric transformations. For example, objects of a certain model (e.g., a shoe model) may have different sizes, where objects of different sizes are related by an isotropic expansion or contraction. Rather than assigning a specific category to each size, in some embodiments, a single normalized shape is used to represent all sizes of the same object. As an example, consider the case in which all virtual views are located on the surface of a sphere centered at the object. A size-invariant representation could be obtained in this case by setting the radius of the sphere to the minimum value such that the object is seen in its entirety by all virtual cameras. Other embodiments of the present invention may use other forms of size normalization. For example, in one embodiment the model itself is rescaled (before virtual views are collected) so as to normalize the average distance of the surface points to the object's center of mass of the object (see, e.g., Tangelder, J. W., & Veltkamp, R. C. (2008). A survey of content based 3-D shape retrieval methods. Multimedia tools and applications, 39(3), 441-471.). Some embodiments of the present invention also relate to orientation normalization. For example, the object could be represented in reference to the system defined by the principal component analysis (PCA) computed on the mesh representing the object's surface (see, e.g., Vranic, D. V., Saupe, D., & Richter, J. (2001). Tools for 3-D-object retrieval: Karhunen-Loeve transform and spherical harmonics. In Multimedia Signal Processing, 2001 IEEE Fourth Workshop on (pp. 293-298).).

Multi-View Shape Descriptors

Figure 3B:
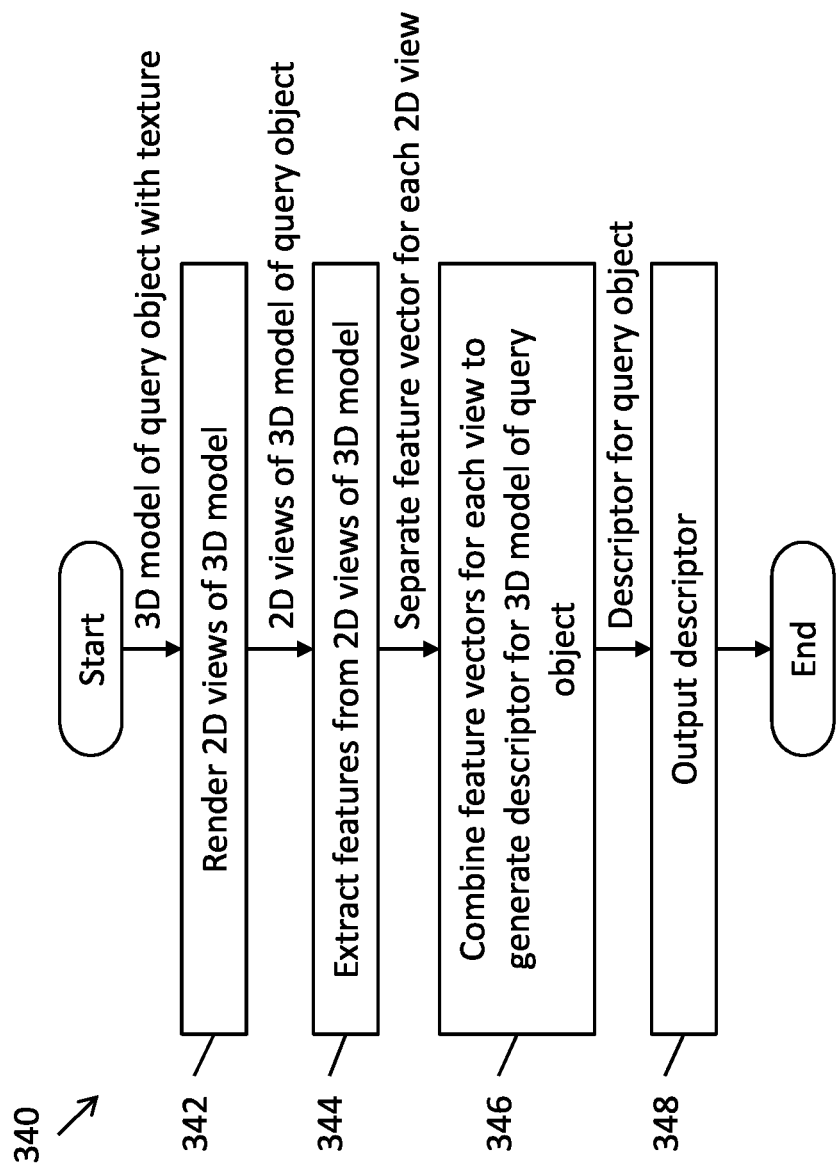
FIG. 3B is a flowchart of a method for computing a descriptor of a query object according to one embodiment of the present invention.
Figure 4:
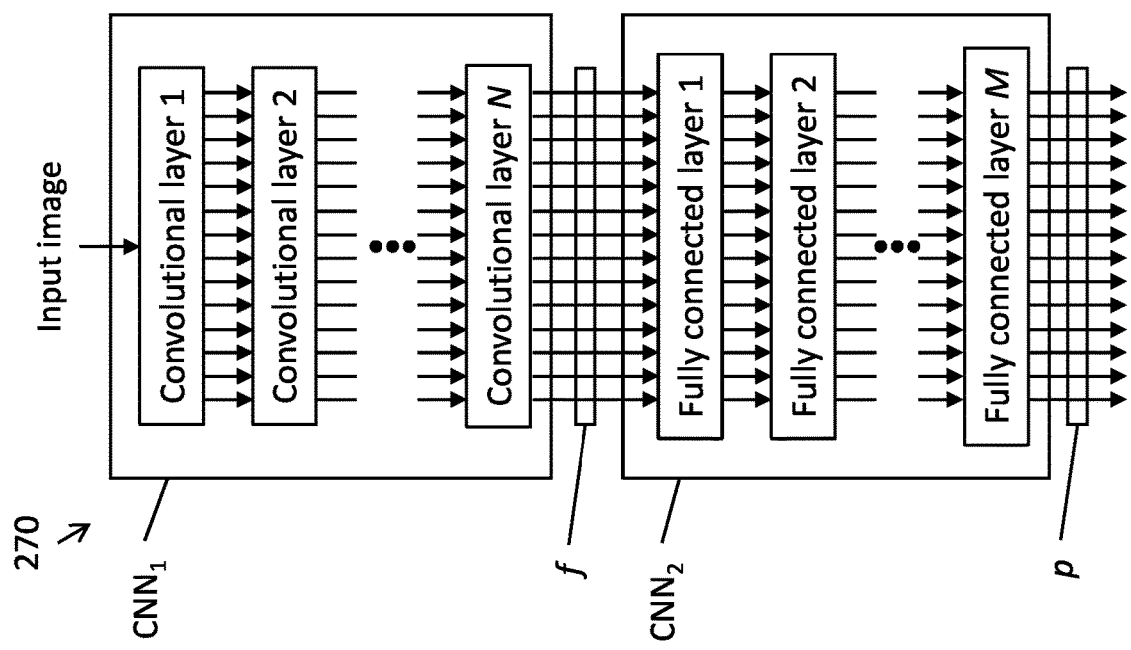
FIG. 4 is a block diagram of a convolutional neural network based classification system according to one embodiment of the present invention.

FIG. 3B is a flowchart of a method for computing a descriptor of a query object according to one embodiment of the present invention. FIG. 4 is a block diagram of a convolutional neural network based classification system according to one embodiment of the present invention.

In particular, in the embodiment shown in FIG. 3B, the descriptor is computed from 2D views 260 of the 3D model 240, as rendered by het view generation module 250. In operation 344, the synthesized 2D views are supplied to a classifier 270 or classifier module 270 to extract a descriptor or feature vector and to classify the object based on the descriptor. This feature vector may contain salient and characteristic aspects of the object's shape, and is used for subsequent classification or retrieval steps.

Generally, the task of classifying a shape s into one of a set C of given classes (also called categories or labels) is distinguished from the task of retrieving from a database the shape that is most similar (under a specific metric) to a given shape. For the sake of convenience herein, shape retrieval will be considered as a special case of classification, in which each shape in the database represents a class in itself, and a shape s is classified with the label of the most similar shape in the database. This approach is sometimes referred to as nearest neighbor classification in the pattern recognition literature.

Several techniques for retrieval and classification from view-based representations of shapes are known in the literature. See, for example, Gao, Y., & Dai, Q. (2014). View-based 3-D object retrieval: challenges and approaches. IEEE MultiMedia, 3(21), 52-57. for a survey of such relevant techniques. For example, one approach (described in Furuya, T., & Ohbuchi, R. (2009, July). Dense sampling and fast encoding for 3-D model retrieval using bag-of-visual features. In Proceedings of the ACM international conference on image and video retrieval (p. 26). ACM.)[0076] expands on the concept of "bags of words," a classic method for object recognition in images, to the case of multi-view object recognition. As another example, convolutional neural networks (CNNs) may be used for multi-view object classification (see, e.g., Su, H., Maji, S., Kalogerakis, E., & Learned-Miller, E. (2015). Multi-view convolutional neural networks for 3-D shape recognition. In Proceedings of the IEEE International Conference on Computer Vision (pp. 945-953).).

According to some embodiments of the present invention, a convolutional neural network (CNN) is used to process the synthesized 2D views to generate the classification of the object. FIG. 4 is a schematic diagram of a classifier module 270 according to one embodiment of the present invention implemented as a deep convolutional neural network (CNN). Generally, a deep CNN processes an image by passing the input image data (e.g., a synthesized 2D view) through a cascade of layers. These layers can be grouped into multiple stages. The deep convolutional neural network shown in FIG. 4 includes two stages, a first stage $CNN_1$ made up of N sub-processes and a second stage $CNN_2$ made up of M layers. In one embodiment, each of the N layers of the first stage CNN1 includes a bank of linear convolution layers, followed by a point non-linearity layer and a non-linear data reduction layer. In contrast, each of the M layers of the second stage CNN2 is a fully connected layer. The output p of the second stage is a class-assignment probability distribution. For example, if the CNN is trained to assign input images to one of k different classes, then the output of the second stage $CNN_2$ is a vector p that includes k different values, each value representing the probability (or "confidence") that the input image should be assigned the corresponding class.

As noted above, embodiments of the present invention may be implement on suitable general purpose computing platforms, such as general purpose computer processors and application specific computer processors. For example, graphical processing units (GPUs) and other vector processors (e.g., single instruction multiple data or SIMD instruction sets of general purpose processors) are often well suited to performing the training and operation of neural networks.

In some embodiments, the neural network is trained based on training data, which may include a set of 3D models of objects and their corresponding labels (e.g., the correct classifications of the objects). A portion of this training data may be reserved as cross-validation data to further adjust the parameters of during the training process, and a portion may also be reserved as a test data to confirm that the network is properly trained.

The parameters of the neural network (e.g., the weights of the connections between the layers) can be used using standard processes for training neural network such as backpropagation and gradient descent (see, e.g., LeCun, Y., & Bengio, Y. (1995). Convolutional networks for images, speech, and time series. The handbook of brain theory and neural networks, 3361(10), 1995.). In addition, the training process may be initialized using parameters from a pre-trained general-purpose image classification neural network (see, e.g., Chatfield, K., Simonyan, K., Vedaldi, A., & Zisserman, A. (2014). Return of the devil in the details: Delving deep into convolutional nets. arXiv preprint arXiv: 1405.3531.).

As shown in FIG. 4, the values computed by the first stage $CNN_1$ (the convolutional stage) and supplied to the second stage $CNN_2$ (the fully connected stage) are referred to herein as a feature vector (or descriptor) f. The feature vector or descriptor may be a vector of data having a fixed size (e.g., 4,096 entries) which condenses or summarizes the main characteristics of the input image. As such, the first stage $CNN_1$ may be referred to as a feature extraction stage of the classification system 270.

The architecture of a classifier 270 described above with respect to FIG. 4 can be applied to classifying multi-view shape representations of 3D objects based on n different 2D views of the object. For example, the first stage $CNN_1$ can be applied independently to each of the n 2D views used to represent the 3D shape, thereby computing a set of n feature vectors (one for each of the 2D views). Aspects of this technique are described in more detail in, for example, Su, H., Maji, S., Kalogerakis, E., & Learned-Miller, E. (2015). Multi-view convolutional neural networks for 3-D shape recognition. In Proceedings of the IEEE International Conference on Computer Vision (pp. 945-953). In some embodiments, the n separate feature vectors are combined using, for example, max pooling (see, e.g., Boureau, Y. L., Ponce, J., & LeCun, Y. (2010). A theoretical analysis of feature pooling in visual recognition. In Proceedings of the 27th international conference on machine learning (ICML-10) (pp. 111-118).).

Figure 5:
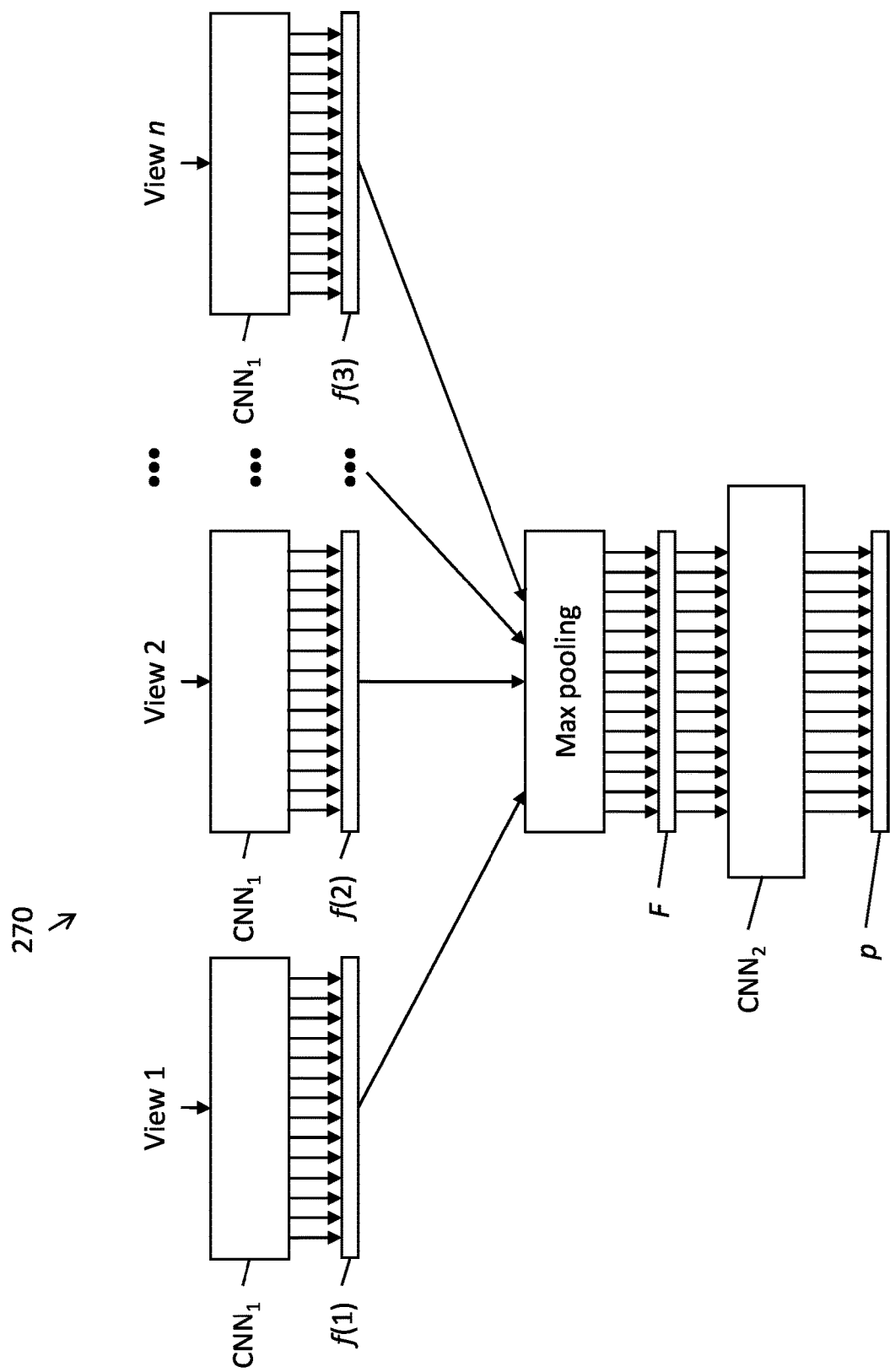
FIG. 5 is a block diagram of a convolutional neural network based classification system configured to account for multiple views according to one embodiment of the present invention.

FIG. 5 is an illustration of max-pooling according to one embodiment of the present invention. As shown in FIG. 5, each of the n views is supplied to the first stage $CNN_1$ of the classifier 270 to generate n feature vectors. In max-pooling, the n feature vectors f are combined to generate a single combined feature vector or descriptor F, where the j-th entry of the descriptor F is equal to the maximum among the j-th entries among the n feature vectors f. The resulting descriptor F has the same length (or rank) as the n feature vectors f and therefore descriptor F can also be supplied as input to the second stage $CNN_2$.

In some embodiments of the present invention, the selection of particular poses of the virtual cameras, e.g., the selection of which particular 2D views to render, results in a descriptor F having properties that are invariant. For example, considering a configuration where all the virtual cameras are located on a sphere (e.g., all arranged at poses that are at the same distance from the center of the 3D model or a particular point p on the ground plane, and all having optical axes that intersect at the center of the 3D model or at the particular point p on the ground plane). Another example of an arrangement with similar properties includes all of the virtual cameras located at the same elevation above the ground plane of the 3D model, oriented toward the 3D model (e.g., having optical axes intersecting with the center of the 3D model), and at the same distance from the 3D model, in which case any rotation of the object around a vertical axis (e.g., perpendicular to the ground plane) extending through the center of the 3D model will result in essentially the same vector or descriptor F (assuming that the cameras are placed at closely spaced locations).

The extracted feature vector can then be supplied to a classifier to classify the object as being a member of one of a particular set of k different classes C, thereby resulting in classification of the query object 10. This can be done, for example, by supplying the descriptor F to the second stage $CNN_2$, resulting in the vector p of normalized positive numbers representing the class-assignment probability distribution. The index of the largest entry of this vector p is the most likely class for the given shape, with the associated maximum value representing the confidence of this classification. As such, the second stage CNN2 may be referred to as a classification stage of the convolutional neural network In some embodiments of the present invention, the classifier $CNN_2$ classifies the target object 10 by using the descriptor F of the target object to retrieve a most similar shape in a data set, rather than by supplying the descriptor F to the second stage $CNN_2$. In more detail, all of the objects in the training set may be supplied to the first stage $CNN_1$ to generate a set of known descriptors $\{F_{ds}(m)\}$, where the index m indicates a particular labeled shape in the training data. A similarity metric is defined to measure the distance between any two given descriptors (vectors) F and $F_{ds}(m)$. Some simple examples of similarity metrics are a Euclidean vector distance and a Mahalanobis vector distance. In other embodiments of the present invention a similarity metric is learned using a metric learning algorithm (see, e.g., Boureau, Y. L., Ponce, J., & LeCun, Y. (2010). A theoretical analysis of feature pooling in visual recognition. In Proceedings of the 27th international conference on machine learning (ICML-10) (pp. 111-118).). A metric learning algorithm may learn a linear or non-linear transformation of feature vector space that minimizes the average distance between vector pairs belonging to the same class (as measured from examples in the training data) and maximizes the average distance between vector pairs belonging to different classes.

Application to Object Categorization and Characterization

Figure 6:
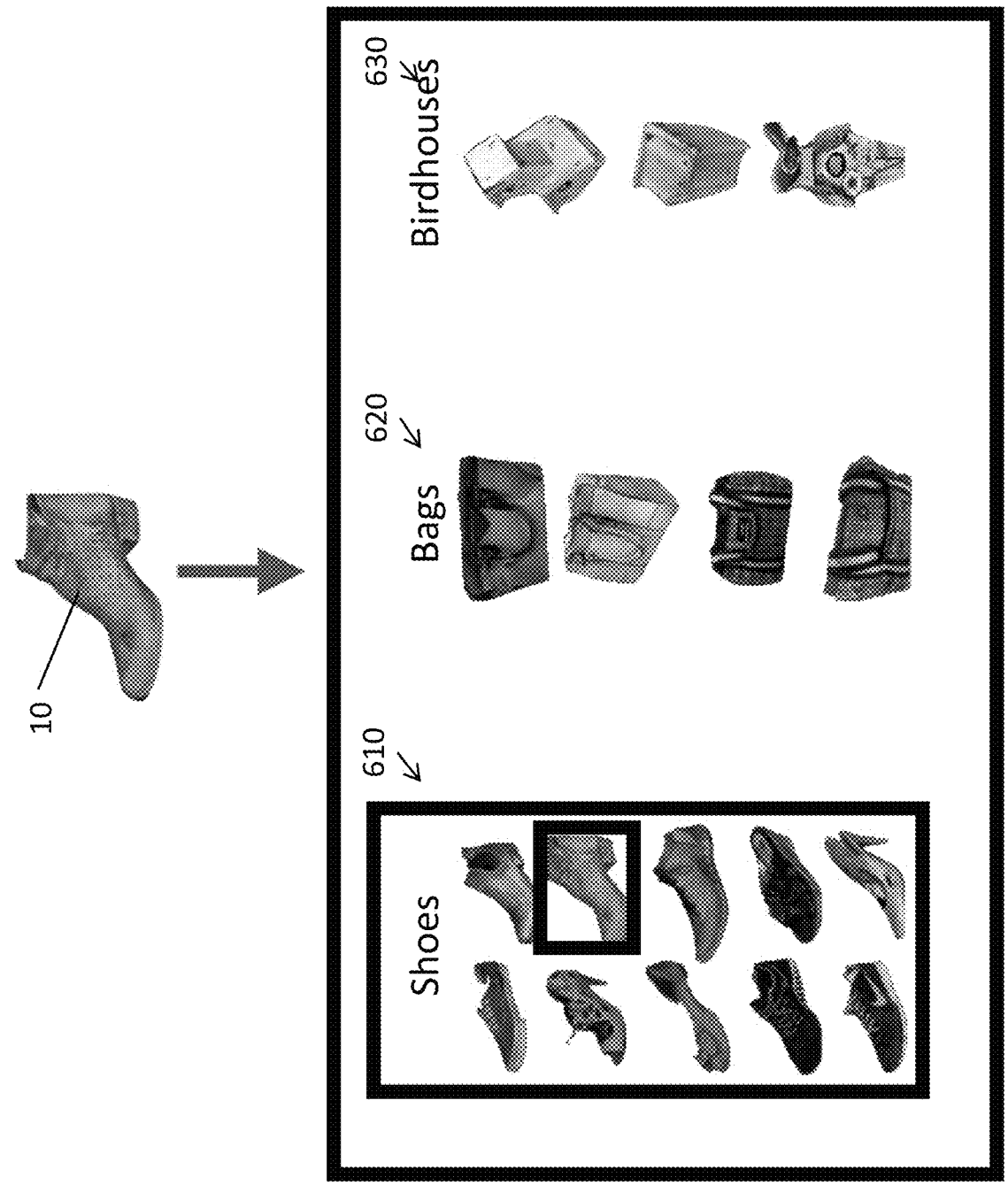
FIG. 6 illustrates an example of a hierarchy that includes two levels of classification according to one embodiment of the present invention.

Some aspects embodiments of the present invention enable the classification of a query object at a particular level of a hierarchy of categories. FIG. 6 illustrates an example of a hierarchy that includes two levels of classification according to one embodiment of the present invention. For the sake of illustration, FIG. 6 depicts an extreme example of a warehouse that manages an inventory of shoes 610, an inventory of bags 620, and an inventory of birdhouses 630, where the query object 10 is automatically classified into the shoe category and may also be classified as a particular style of shoe within the shoe category. Each of these inventories may include many items of different types (e.g., the shoe inventory may have many different brands and styles of shoes, the bag inventory may have many different brands and styles of bags, and the birdhouse inventory may have many different styles of birdhouses).

Different applications may require different levels of granularity of classification. For example, pairing a left shoe with its matching right shoe may use a highly granular classification of both the left and right shoes to ensure that the two shoes actually match, whereas detecting the type of object (e.g., shoe, bag, or birdhouse) for automatic redirection by the conveyor system to a particular corresponding processing line (e.g., a processing line for shoes, a processing line for bags, or a processing line for birdhouses) may use a less granular classification.

Generally speaking, performing finer (or more granular) classifications involves greater computational resources. For example, the second stage $CNN_2$ of the convolutional neural network may require additional layers in order to achieve good performance when classifying into one of a large number of categories (e.g., a large number of output classes k, such as when classifying an object as being one of a particular brand and style of shoe), whereas good performance may be achieved with fewer layers if the number of output classes is small (e.g., a small number of output classes k, such as when classifying an object as being a shoe, a bag, or a birdhouse). As another example, when classifying objects based on distance from a database of known objects, fewer vector distance comparisons are made when the number of output classes is small (low granularity) than when the number of output classes is large (high granularity). As such, in some circumstances where high speed of classification is desired due to a high throughput of items (such as automatically classifying a large number of objects moving quickly along a conveyor system and redirecting the objects based on the classification results), it may be beneficial to classify objects at a lower level of granularity.

As noted above, in some embodiments of the present invention, the classification system 270 may include a feature extraction stage $CNN_1$ and a classification stage $CNN_2$, where the output of the feature extraction stage $CNN_1$ is referred to as a descriptor F. In some embodiments, the descriptor F summarizes the appearance of an object as seen from multiple viewpoints. The feature extraction stage $CNN_1$ is functionally and logically separate from the classification stage $CNN_2$. As such, the same descriptors F may be used, regardless of the level or granularity at which the classifications are made and therefore, in various embodiments of the present invention, different classifiers $CNN_2$ may be used with the same feature extraction stage $CNN_1$, in accordance with the level of granularity that is needed by the application.

The various classifiers may be specialized to particular tasks, such as broad inventory recognition (e.g., shoes versus bags versus birdhouses), finer granularity (e.g., boots versus sneakers versus heels), or identification of a particular similar object in an inventory (e.g., a particular brand and style of shoe). In various embodiments of the present invention, the classification stage $CNN_2$ may be implemented using, for example, a fully connected neural network (with one or more hidden layers), a linear or non-linear classifier (e.g., a support vector machine), or nearest or k-nearest neighbor classifiers (in some embodiments using matric learning).

In more detail, an additional parameter may be supplied as input to the classifier module 270, where the additional parameter is used to identify which classification stage $CNN_2$ is to be used in performing the classification. The parameter may be specified based on a desired level of granularity (e.g., classifying on the inventory level versus on the style level) or may specify a classification stage $CNN_2$ that is specialized for particular types of objects (e.g., shoes), if there is a priori knowledge that the object belongs to a particular inventory.

Furthermore, the logical separation between the feature extraction stage $CNN_1$ and the classification stage $CNN_2$ enables embodiments of the present invention to retrain or modify the classification stage $CNN_2$ without necessarily retraining the feature extraction stage $CNN_1$. For example, if a new inventory of objects is acquired (e.g., an inventory of pillows is added to the separate inventories of shoes, bags, and birdhouses) or if more items are added to an existing inventory (e.g., an additional brand of shoes is added to the inventory), in some embodiments of the present invention, the new items can be added to the classifier by supplying the new items to the feature extraction stage $CNN_1$ to generate a corresponding descriptor F for each of the new items and then retraining or reconfiguring only the classifier stage $CNN_2$ based on the descriptors for the newly added items. For example, in the case of a fully connected neural network based classifier stage $CNN_2$, the descriptors F and category labels associated with the new items are combined with the descriptors and labels of the previous training data and the combined descriptors and labels are used to retrain the neural network classifier stage (e.g., setting the weights of the connections between the neurons) using, for example, backpropagation and gradient descent. As another example, in the case of a nearest neighbor (or k-nearest neighbors) based classification stage $CNN_2$, the descriptors F of the additional items are merely added as additional clusters that the descriptors of the query objects (or "query descriptors") are compared with in order to find a most similar known descriptor.

In contrast, comparative classification systems require that the entire neural network, including the convolutional stage, be retrained based on the new training data. As such, retraining or reconfiguring only the classification stage $CNN_2$ reduces the time and computational resources required to reconfigure or retrain the classification system 270 to recognize new types of items, because the feature extraction convolutional neural network $CNN_1$ does not need to be retrained. This benefit is conferred in embodiments using a fully connected neural network based classifier and in embodiments using a nearest neighbor classifier, at least because extracting a descriptor using a convolutional neural network based feature extractor $CNN_1$ is computationally expensive.

As such, aspects of embodiments of the present invention improve the ability for a categorization system to be reconfigured to handle additional types of objects or to handle additional styles of objects without requiring substantial retraining.

In some embodiments, such as when one or more inventories are added, or an inventory is substantially expanded, it may be beneficial to update the descriptor representation to better model the appearance of the expanded set of objects. For example, the feature extraction stage $CNN_1$ is trained to extract features that are useful for representing and distinguishing the objects in the training data. However, these features may not necessarily accurately represent features of distinguishing between the categories of the newly added objects. As such, in some embodiments, the full network (including the convolutional layers of the feature extraction stage $CNN_1$) are retrained, rather than only the fully connected classification layers $CNN_2$. Note that updating the feature extraction stage $CNN_1$ also involves re-computing and the descriptors of the training data set for purposes of nearest neighbor classification because retraining the feature extraction stage $CNN_1$ causes different features to be computed, thereby making the old descriptors incompatible with the new classification stage $CNN_2$.

In addition to the shape descriptors discussed above, other characteristic features can be used to help categorize an object, or to refine categorization to a finer granularity. Consider for example the case of a handbag that is produced in a variety of five different models or styles, each of which comes in two colors. A classifier based on shape descriptors may correctly identify the model or style, but not the color, of a given handbag. If the specific color of the handbag is also of interest, other features (e.g., the histogram of red, green, and blue (RGB) color values from the pixels in one or more views) may also be included in the input data, and an appropriate color classifier may be trained to output a color class for a given input. Another example relates to identifying the size of an object (e.g., a shoe) along with its model. As noted above, analysis of the shape using two-dimensional views allows for size invariance properties. As such, the size information of the target object is available through analysis of the 3D representation of the object shape, because the underlying depth information from the depth cameras includes information about lengths.

Furthermore, embodiments of the present invention allow different features to be used to directly to query a data set. For example, one may be interested in determining which other objects in a certain inventory have the same color as a given object. These other objects having the same color can be found by identifying objects in the inventory having the same color feature (or very similar color features) to the given object, while ignoring the other features of the descriptor (e.g., descriptors relating to shape).

As noted above, the classifications computed by the classification system 200 according to embodiments of the present invention may be applied to perform various operations. As one example, the classifications may be automatically displayed to a user to allow the user to view the classifications of the objects placed in view of the depth and color cameras 100 and 150. As another example, the classifications may be used to scan objects moving on a conveyor system and to control the conveyor system to redirect the objects in accordance with the classifications (e.g., for sorting objects of different types or to otherwise group objects together in accordance with business needs, such as assembling orders for particular customers). The redirecting of the objects may be implemented using various movable mechanical parts, such as a controllable door, a movable slot, a robotic arm, and the like.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for classifying physical objects comprising:
controlling, by a processor, one or more depth cameras to capture a plurality of depth images of a query object;
controlling, by the processor, one or more color cameras to capture a plurality of color images of the query object;
computing, by the processor, a three-dimensional (3D) model of the query object using the depth images;
combining, by the processor, the color images with the 3D model;
computing, by the processor, a descriptor from the 3D model and the color images, the descriptor comprising:
a multi-dimensional shape descriptor space representation of a 3D shape of the query object;
a multi-dimensional color descriptor space representation of a texture of the query object; and a one-dimensional size descriptor space representation of a size of query object;

supplying, by the processor, the descriptor to a classifier to compute a classification of the query object; and outputting the classification of the query object.

2. The method of claim 1, further comprising controlling a conveyor system configured to convey the query object to redirect the query object in accordance with the classification of the query object.

3. The method of claim 1, further comprising displaying the classification of the query object on a display device.

4. The method of claim 1, wherein the classifier is a neural network.

5. The method of claim 4, wherein the neural network is trained based on an inventory of objects.

6. The method of claim 5, wherein the computing the classification of the query object based on the descriptor is performed by identifying a result object from the inventory of objects having a closest distance to the descriptor of the query object in shape descriptor space, color descriptor space, and size descriptor space.

7. The method of claim 1, wherein the 3D model comprises a 3D mesh model computed from the depth images.

8. The method of claim 7, further comprising:

rendering a plurality of two-dimensional (2D) views of the 3D mesh model; and computing the descriptor by supplying the 2D views to a convolutional stage of a neural network.

9. A system for classifying physical objects comprising:

a processor; and memory storing instructions that, when executed by the processor, cause the processor to:

control one or more depth cameras to capture a plurality of depth images of a query object;

control one or more color cameras to capture a plurality of color images of the query object;

compute a three-dimensional (3D) model of the query object using the depth images;

combine the color images with the 3D model;

compute a descriptor from the 3D model and the color images, the descriptor comprising:

a multi-dimensional shape descriptor space representation of a 3D shape of the query object;

a multi-dimensional color descriptor space representation of a texture of the query object; and a one-dimensional size descriptor space representation of a size of query object;

supply the descriptor to a classifier to compute a classification of the query object; and output the classification of the query object.

10. The system of claim 9, further comprising a conveyor system configured to convey the query object, wherein the memory further stores instructions that, when executed by the processor, cause the processor to redirect the query object in accordance with the classification of the query object.

11. The system of claim 9, further comprising a display device, wherein the memory further stores instructions that, when executed by the processor, cause the processor to display the classification of the query object on the display device.

12. The system of claim 9, wherein the classifier is a neural network.

13. The system of claim 12, wherein the neural network is trained based on an inventory of objects.

14. The system of claim 13, wherein the memory further stores instructions that, when executed by the processor, cause the processor to compute the classification of the query object by identifying a result object from the inventory of objects having a closest distance to the descriptor of the query object in shape descriptor space, color descriptor space, and size descriptor space.

15. The system of claim 9, wherein the 3D model comprises a 3D mesh model computed from the depth images.

16. The system of claim 15, wherein the memory further stores instructions that, when executed by the processor, cause the processor to compute the descriptor by:

rendering a plurality of two-dimensional (2D) views of the 3D mesh model; and computing the descriptor by supplying the 2D views to a convolutional stage of a neural network.

* * * * *